United States Patent Office 3,446,756
Patented May 27, 1969

3,446,756
METHOD OF MAKING RESINOUS EPOXY PRE-
POLYMERS AND CURING OF SAME
Thomas Ramos, 536 Fort Washington Ave.,
New York, N.Y. 10033
No Drawing. Continuation-in-part of application Ser. No.
281,368, May 17, 1963. This application Dec. 6, 1965,
Ser. No. 512,269
Int. Cl. C08g 30/10, 30/14
U.S. Cl. 260—2   17 Claims

ABSTRACT OF THE DISCLOSURE

Prepolymer resins are prepared by mixing together a diglycidyl ether which is obtained from epichlorohydrin and a polyhydric alcohol having a hydrocarbon chain between the hydroxyl groups with certain aromatic chlorine-hindered diamines or aromatic sulphur-containing diamine or with a hydroquinone. The resulting prepolymer may be cured by adding to said prepolymer, after it has been heated, a specified proportion of a curing agent such as an aromatic amine, aliphatic amine or an acid anhydride. (With the aliphatic amine, the curing can take place at room temperature.) The cured prepolymers are particularly useful for encapsulating, laminating coating and for synthetic foam applications.

Cross reference to related application

This application is a continuation-in-part of application Ser. No. 281,368, filed May 17, 1963, now abandoned.

The invention described herein may be manufactured and used by or for the Government of the United States of America for governmental purposes without the payment of any royalties thereon or therefor.

This invention relates to synthetic resinous materials or polymers, and more particularly to those useful for embedding, encapsulating, laminating, casting, filament winding, sealing, plotting, reinforced plastics, coating, and syntactic foam applications.

There has long been a need for a satisfactory resin that can be used to encapsulate or embed delicate equipment and various items for their protection, but resins heretofore available for this purpose have been unsatisfactory for various reasons, one of which was because they were so brittle and hard that they did not give the desired degree of protection.

An object of this invention is to provide new and improved resins, and methods of making them, which are especially useful, suitable and practical for embedding and encapsulating electronic equipment and other items, and as coating materials, which have desired physical properties including selected flexibility, elasticity, degree of hardness and structural strength when cured to make them suitable for the intended purpose, and which are relatively inexpensive, easily made, and practical and durable in use.

Other objects and advantages will appear from the following description of some examples of the invention, and the novel features will be particularly pointed out in connection with the appended claims.

In accordance with this invention, synthetic resins having important and useful physical properties may be prepared by the reaction of certain diglycidyl ethers such as those obtained from certain polyhydric alcohols, with either an aromatic chlorine hindered diamine or aromatic sulphur-containing diamine such as, for example, 4,4'-methylene-bis(2 chloroaniline) or 4,4'-diaminodiphenyl sulfone, or with hydroquinone and also its derivatives such as monotertiary-butyl hydroquinone, toluhydroquinone and hydroquinone monomethyl ether to produce a prepolymer and then adding to the prepolymer product of such reaction, at a time just prior before curing of such product is desired, a suitable curing agent such as an aromatic amine or aliphatic amine or an acid anhydride. The reaction products thus obtained are, for convenience, called glyamine resins after curing and glyamine prepolymers before curing.

Examples of diglycidyl ethers obtained from epichlorohydrin and a polyhydric alcohol which may be employed are disclosed in U.S. Patent No. 3,033,803 issued on May 8, 1962. Some examples of polyhydric alcohols that may be used in preparing diglycidyl ethers of polyhydric alcohols are those having a hydrocarbon chain between the hydroxyl groups. These polyhydric alcohols are advantageous in imparting an aliphatic hydrocarbon element into the resulting glycide ether. Among such alcohols are ethylene glycol, butanediol, pentanediol, diethylene glycol, triethylene glycol, hexanetriol, glycerol, and various polyethylene glycols and polypropylene glycols, etc. These diglycidyl ethers obtained with such polyhydric alcohols in accordance with the disclosure in said U.S. Patent 3,033,803 are the basic component used for reaction with the particular diamines or with the hydroquinone or its derivatives in accordance with this invention.

Some specific examples of the polyhydric alcohols used for the preparation of the diglycidyl ethers that may be employed include ethylene glycol; diethylene glycol; triethylene glycol; tripropylene glycol; 1,5-pentanediol; 1,4-butanediol; 1,3-butanediol; 2,3-butanediol and 2-butenediol-1,4.

To be even more specific, glyamine prepolymers are the reaction products of any one of the diglycidyl ethers of polyhydric alcohols described above and as illustrated below, with any one of the hydroquinones, or any one of the aromatic diamines as listed below:

Diglycidyl ethers of polyhydric alcohols 1,4-butanediol diglycidyl ether
1,3-butanediol diglycidyl ether
2,3-butanediol diglycidyl ether
1,5-pentanediol diglycidyl ether
ethylene glycol diglycidyl ether
diethylene glycol diglycidyl ether
triethylene glycol diglycidyl ether
tripropylene glycol diglycidyl ether
hexanetriol diglycidyl ether
polyethylene glycol diglycidyl ether
glycerine diglycidyl ether
2-butenediol 1,4-diglycidyl ether Hydroquinones hydroquinone
toluhydroquinone
hydroquinone monomethyl ether
mono-tertiary-butyl hydroquinone Aromatic diamines 4,4'-methylene-bis(2-chloroaniline)
4,4'-diaminodiphenyl sulfone Specific combinations of diglycidyl ethers and the other co-reactant to produce the glyamine prepolymers of the present invention are tabulated below:

Glyamine prepolymers

The said prepolymers are the reaction products of:

1,4-butanediol diglycidyl ether and hydroquinone
1,4-butanediol diglycidyl ether and toluhydroquinone
1,4-butanediol diglycidyl ether and hydroquinone monomethyl ether
1,4-butanediol diglycidyl ether and mono-tertiary-butyl-hydroquinone 1,4-butanediol diglycidyl ether and 4,4'-methylene-bis (2-chloroaniline)
1,4-butanediol diglycidyl ether and 4,4'-diaminodiphenyl sulfone
1,3-butanediol diglycidyl ether and hydroquinone
1,3-butanediol diglycidyl ether and toluhydroquinone
1,3-butanediol diglycidyl ether and hydroquinone monomethyl ether
1,3-butanediol diglycidyl ether and mono-tertiary-butylhydroquinone
1,3-butanediol diglycidyl ether and 4,4'-methylene-bis (2-chloroaniline)
1,3-butanediol diglycidyl ether and 4,4'-diaminodiphenyl sulfone
2,3-butanediol diglycidyl ether and hydroquinone
2,3-butanediol diglycidyl ether and toluhydroquinone
2,3-butanediol diglycidyl ether and hydroquinone monomethyl ether
2,3-butanediol diglycidyl ether and mono-tertiary-butyl-hydroquinone
2,3-butanediol diglycidyl ether and 4,4'-methylene-bis (2-chloroaniline)
2,3-butanediol diglycidyl ether and 4,4'-diaminodiphenyl sulfone
2-butenediol 1,4-diglycidyl ether and hydroquinone
2-butenediol 1,4-diglycidyl ether and toluhydroquinone
2-butenediol 1,4-diglycidyl ether and hydroquinone monomethyl ether
2-butenediol 1,4-diglycidyl ether and mono-tertiary-butyl-hydroquinone
2-butenediol 1,4-diglycidyl ether and 4,4'-methylene-bis(2 chloroaniline)
2-butenediol-1,4-diglycidyl ether and 4,4'-diaminodiphenyl sulfone
1,5-pentanediol diglycidyl ether and hydroquinone
1,5-pentanediol diglycidyl ether and toluhydroquinone
1,5-pentanediol diglycidyl ether and hydroquinone monomethyl ether
1,5-pentanediol diglycidyl ether and mono-tertiary-butyl-hydroquinone
1,5-pentanediol diglycidyl ether and 4,4'-methylene-bis (2-chloroaniline)
1,5-pentanediol diglycidyl ether and 4,4'-diaminodiphenyl sulfone
ethylene glycol diglycidyl ether and hydroquinone
ethylene glycol diglycidyl ether and toluhydroquinone
ethylene glycol diglycidyl ether and hydroquinone monomethyl ether
ethylene glycol diglycidyl ether and mono-tertiary-butylhydroqninone
ethylene glycol diglycidyl ether and 4,4'-methylene-bis (2-chloroaniline)
ethylene glycol diglycidyl ether and 4,4'-diaminodiphenyl sulfone
diethylene glycol diglycidyl ether and hydroquinone
diethylene glycol diglycidyl ether and toluhydroquinone
diethylene glycol diglycidyl ether and hydroquinone monomethyl ether
diethylene glycol diglycidyl ether and mono-tertiary-butyl-hydroquinone
diethylene glycol diglycidyl ether and 4,4'-methylene-bis (2-chloroaniline)
diethylene glycol diglycidyl ether and 4,4'-diaminodiphenyl sulfone
triethylene glycol diglycidyl ether and hydroquinone
triethylene glycol diglycidyl ether and toluhydroquinone
triethylene glycol diglycidyl ether and hydroquinone monomethyl ether
triethylene glycol diglycidyl ether and mono-tertiary-butyl-hydroquinone
triethylene glycol diglycidyl ether and 4,4'-methylene-bis (2-chloroaniline)
triethylene glycol diglycidyl ether and 4,4'-diaminodiphenyl sulfone
tripropylene glycol diglycidyl ether and hydroquinone
tripropylene glycol diglycidyl ether and toluhydroquinone
tripropylene glycol diglycidyl ether and hydroquinone monomethyl ether
tripropylene glycol diglycidyl ether and mono-tertiary-butyl-hydroquinone
tripropylene glycol diglycidyl ether and 4,4'-methylene-bis (2-chloroaniline)
tripropylene glycol diglycidyl ether and 4,4'-diaminodiphenyl sulfone
hexanetriol diglycidyl ether and hydroquinone
hexanetriol diglycidyl ether and toluhydroquinone
hexanetriol diglycidyl ether and hydroquinone monomethyl ether
hexanetriol diglycidyl ether and mono-tertiary-butylhydroquinone
hexanetriol diglycidyl ether and 4,4'-methylene-bis (2-chloroaniline)
hexanetriol diglycidyl ether and 4,4'-diaminodiphenyl sulfone
polyethylene glycol diglycidyl ether and hydroquinone
polyethylene glycol diglycidyl ether and toluhydroquinone
polyethylene glycol diglycidyl ether and hydroquinone monomethyl ether
polyethylene glycol diglycidyl ether and mono-tertiary-butyl-hydroquinone
polyethylene glycol diglycidyl ether and 4,4'-methylene-bis (2-chloroaniline)
polyethylene glycol diglycidyl ether and 4,4'-diaminodiphenyl sulfone
glycerine diglycidyl ether and hydroquinone
glycerine diglycidyl ether and toluhydroquinone
glycerine diglycidyl ether and hydroquinone monomethyl ether
glycerine diglycidyl ether and mono-tertiary-butylhydroquinone
glycerine diglycidyl ether and 4,4'-methylene-bis (2-chloroaniline)
glycerine diglycidyl ether and 4,4'-diaminodiphenyl sulfone The reaction products as obtained are low viscosity liquids. They are converted to solid thermoset resins by the subsequent addition of a curing agent comprising one of a group of polyamines or acid anhydrides as hereinafter described. In preparing the above prepolymers, it has been found that for each 100 parts by weight of diglycidyl ether, there should be employed from about 15 to 85 parts by weight of the amine or phenolic co-reactant.

The general procedure for preparing the prepolymers of the present invention involves mixing the reactants, and preferably by adding to the preheated diglycidyl ether the other co-reactant, maintaining the reaction mixture, while stirring, to a temperature between about 100° C. (212° F.) and about 115° C. (240° F.) but not over 1950° C. (about 300° F.) until a homogenous liquid is obtained. When such homogeneity results, the reaction mixture is immediately cooled to about room temperature, i.e., between about 50° F. and 100° F.

The following examples will illustrate the preparation of prepolymers and cured resins in accordance with this invention, without being deemed limitative thereof. Parts are by weight unless otherwise indicated.

Example 1

55.0 parts by weight of 4,4' - methylene - bis (2-chloroaniline) are added slowly while stirring to 100.00 parts by weight of 1,4-butanediol diglycidyl ether that has been preheated to between 212–225° F. The mixture is thereafter maintained at between 212–225° F. while stirring until a homogeneous liquid is obtained. If the temperature exceeds 250° F., the reaction is too rapid and should be avoided. External cooling may be used, if necessary. The reaction product thus obtained is immediately cooled to room temperature to inhibit further reaction and is hereinafter, for convenience, called "Glyamine A" prepolymer.

The "Glyamine A" prepolymer as obtained in accordance with Example 1, may be reacted further by the subsequent addition of an amine agent at the time polymerization is desired as in the following example.

Example 2

35.0 parts by weight of "Glyamine A" prepolymer of Example 1 are mixed thoroughly with about 3.5 parts by weight diethylenetriamine, at about 80° F. The said thoroughly mixed reactants are cast into a 2 inch diameter mold having a cavity about one inch deep. After a reaction time of about 40 to 50 minutes at about 80° F., a synthetic resinous product is obtained and is hereinafter called "Glyamine" resin.

Another example using a different amine curing agent and processed as in Example 2 above is as follows.

Example 3

Constituents: Parts by weight, grams
"Glyamine A" Prepolymer of Example 1 ____ 35.0
Triethylenetetramine _____ 3.5

After a reaction time of about 60 minutes at about 80° F., a synthetic resinous product is obtained and is also called "Glyamine" resin. If prepolymer as obtained in accordance with Example 1 contains an inhibitor, use about 5.25 grams triethylenetetramine.

Example 4

Constituents: Parts by weight
"Glyamine A" Prepolymer of Example 1 ___ 100
Diethylenetriamine _____ 8 to 18

Example 5

Constituents: Parts by weight
"Glyamine A" Prepolymer of Example 1__ 100
Triethylenetetramine _____ 10 to 20

Typical or representative tabulations of approximate amounts of constituents used in obtaining "Glyamine A" prepolymer in accordance with the process as outlined in Example 1, are as follows.

Example 6

Constituents: Parts by weight
1,4-butanediol diglycidyl ether _____ 100
4,4'-methylene-bis (2-chloroaniline) _____ 15 to 85

A specific example of a "Glyamine A" prepolymer prepared from the reaction of 1,4-butanediol diglycidyl ether with 4,4'-diaminodiphenyl sulfone is as follows.

Example 7

55.0 parts by weight of 4,4'-diaminodiphenyl sulfone are added slowly while stirring to 100 parts by weight 1,4-butanediol diglycidyl ether, preheated to between 240-250° F. The mixture is thereafter maintained at between 240-250° F. while stirring until a homogeneous liquid is obtained. The temperature should not exceed 250° F., using external cooling, if necessary. The reaction product thus obtained is immediately cooled to room temperature and is hereinafter called "Glyamine A" prepolymer.

The "Glyamine A" prepolymer as obtained in accordance with Example 7 above, may be reacted further by the subsequent addition of an amine curing agent at the time polymerization is desired as follows.

Example 8

Constituents: Parts by weight, grams
"Glyamine A" Prepolymer _____ 30.0
Triethylenetetramine _____ 3.6

The resinous product thus obtained is also called a "Glyamine" resin.

The following example is a typical or representative tabulation of approximate amounts of consituents used in obtaining "Glyamine A" prepolymer in accordance with the process as outlined in Example 7 above and is as follows.

Example 9

Constituents: Parts by weight
1,4-butanediol diglycidyl ether _____ 100
4,4'-diaminodiphenyl sulfone _____ 15 to 85

The above Examples 7 and 9 serve to illustrate that as a general rule "Glyamine A" prepolymers can be prepared in different ways to yield products which exhibit a range of properties depending on choice of reactants, method of preparation and ratio of reactants.

4,4'-methylenebis(2-chloroaniline) comes in several physical forms, one form being a fine powder, light tan in color, the other form being in pellets almost white in color. It is preferred to use it in the physical form of pellets which are almost white in color.

For the sake of color, uniformity of product and quality control of the products as made in accordance with my invention, it is preferred that the physical form of pellets be used.

Substitution of one physical form of 4,4'-methylenebis(2-chloroaniline) or other will yield products of different colors and properties which will lack some uniformity of product from batch to batch.

Example 10

55.0 parts by weight of mono-tertiary-butylhydro-quinone are added slowly, while stirring to 100.0 parts by weight 1,4-butanediol diglycidyl ether, preheated to between 250-260° F. The mixture is thereafter maintained at between 250-260° F., while stirring until a homogeneous liquid is obtained. The temperature should not exceed 260° F., using external cooling if necessary. The reaction product thus obtained is immediately cooled to room temperature and is hereinafter called "Glyamine B" prepolymer. The "Glyamine B" prepolymer as obtained in accordance with the procedure of Example 10, may be reacted further by the subsequent addition of an amine curing agent at the time polymerization is desired as follows.

Example 11

Constituents: Parts by weight, grams
"Glyamine B" prepolymer _____ 30.0
Triethylenetetramine _____ 3.6

The said above thoroughly mixed reactants gelled in about three minutes at 74° F. A synthetic resinous product is obtained and is hereinafter called "Glyamine B" resin.

Another example using a different amine curing agent and prepared as per Example 11 above is as follows.

Example 12

Constituents: Parts by weight, grams
"Glyamine B" prepolymer _____ 35.0
Diethylenetriamine _____ 2.8

A synthetic resinous product is obtained which is also called "Glyamine B" resin.

The following examples are typical or representative tabulations of approximate amounts of constituents used in obtaining "Glyamine B" resin.

Example 13

Constituents: Parts by weight
"Glyamine B" prepolymer _____ 100
Diethylenetriamine _____ 4 to 10

Example 14

Constituents: Parts by weight
"Glyamine B" prepolymer _____ 100
Triethylenetetramine _____ 5 to 12

Typical or representative tabulations of approximate amounts of constituents used in obtaining "Glyamine B" prepolymer in accordance with process as outlined in Example 10 are as follows.

Example 15

| Constituents: | Parts by weight |
|---|---|
| 1,4-butanediol diglycidyl ether | 100 |
| Mono-tertiary butylhydroquinone | 15 to 85 |

In each of all examples given herein, the mixing may be performed in any manner such as, for example, in propeller type mixers or stirrers, or by any other efficient means for producing a homogeneous product. Thorough mixing of the components or constituents both before and after addition of the curing agent is requisite to attainment of the ultimate desired properties in the uncured or cured system and/or end use products.

Other hydroquinones which find use in the preparation of "Glyamine B" prepolymer are as follows:

2,5-ditertiary-butylhydroquinone.

Other amine curing agents for "Glyamine A" or "Glyamine B" prepolymers may be employed in place of and in conjunction with diethylenetriamine or triethylenetetramine, and may includes the following:

Aliphatic amines

N-aminoethylpiperazine
Epon Curing Agent U
Epon Curing Agent T1
Tetraethylenepentamine
3-isopropylaminopropylamine
Trimethylenediamine
Diethylaminopropylamine
Propylene diamine

Aromatic amines

Meta-phenylenediamine
Naphthylene diamine
Meta-tolylene diamine
Ortho-tolylene diamine
Methylene dianiline
3,3',4,4'-tetraminobiphenyl
Epon Curing Agent Z As a general criterion, the particular curing agent employed in these examples will be determined by the maximum operating temperature limits and flexibility of the cured resin. Since the curing agent used in this invention becomes an integral part of the cured resin, the type and amount of curing agent employed has a profound effect on the physical and chemical properties of the cured resin.

The following generalizations should prove useful in selecting other amines for use in this invention:

(a) To be useful as room temperature curing agents for this invention, the amines or amine mixtures must have an average functionality greater than about 2, i.e., more than 2 amine hydrogens per molecule.

(b) Aromatic amines, those which have the amine groups attached directly to a benzene ring or other aromatic nucleus, are usually suitable as elevated temperature curing agents for this invention.

(c) Provided that suitable curing agents, as defined in (a) or (b) above, are used, the degree of cure, as measured by hardness, solvent resistance and/or flexibility, increases with functionality of the amine and decreases as the distance between amine hydrogens increases.

(d) Flexibility and flexibility retention fall off with increasing degree of cure.

Acid anhydrides are also usable as curing agents for "Glyamine A" and/or "Glyamine B" prepolymers. Suitable acid anhydrides are as follows:

Acid anhydrides

Phthalic anhydride
Maleic anhydride
Hexahydrophthalic anhydride
Pyromellitic dianhydride
Dodecenyl succinic anhydride
Dichloromaleic anhydride
Chlorendic anhydride
Nadic methyl anhydride
Succinic anhydride
Tetrahydrophthalic anhydide
Nadic anhydride The chemical name for "nadic anhydride" is endocisbicyclo [2.2.1]-5-heptene-2,3-dicarboxylic anhydride. The chemical name for "nadic methyl anhydride" is methylbicyclo [2.2.1]heptene-2,3-dicarboxylic anhydride isomers. For ease of handling, it is generally preferred to use liquid or low melting (at about 280° F., or less) acid anhydrides. The anhydrides enter into the reaction chemically in curing, not as catalysts.

The following representative examples are very general amounts of acid anhydrides, in parts by weight, to 100 parts by weight each of "Glyamine A" or "Glyamine B" prepolymer, required to cure the said prepolymers. As a rule, heat or elevated temperatures is required to cure the said prepolymers when acid anhydrides are employed as the curing agent.

Selected curing temperatures may range, preferably, from above 300° F. to 500° F. and the time to effect a cure will vary from 1 to 24 hours. This procedure is in contradistinction to the one where an amine curing agent is used. In the latter case, rapid cures (2 minutes to 1 hour) may be effected without added heat or by the use of but little heat.

| Acid anhydride: | Parts by weight |
|---|---|
| Dodecenylsuccinic anhydride | 30–100 |
| Nadic anhydride | 30–105 |
| Hexahydrophthalic anhydride | 30–102 |
| Tetrahydrophthalic anhydride | 25–100 |
| Phthalic anhydride | 26–98 |
| Succinic anhydride | 13–85 |
| Maleic anhydride | 10–82 |
| Nadic methyl anhydride | 30–110 |

If too long a pot life or cure schedule is found with Glyamine prepolymers when acid anhydrides are used as the curing agents, the following compounds may be employed in conjunction with the acid anhydrides to accelerate the rate of cure. This is done by adding from 0.5 to 2.0 parts by weight of the accelerator to 100 parts by weight of the prepolymer. Typical examples of accelerators are as follows:

Accelerators

Benzyldimethylamine
Dimethylaminomethyl-phenol
Tridimethylaminomethyl-phenol
Boron trifluoride-monoethylamine complex The effect of these accelerators varies, of course, with the acid anhydride and the type of Glyamine prepolymer used. By their use, either the time, the temperature of the cure, or both may be reduced to give the desired results. The type and concentration of accelerator employed depend on the end-use of the Glyamine mixture and the facilities available for fabrication.

A typical example of the pot life of a "Glyamine A" prepolymer at elevated temperature in the presence of nadic methyl anhydride, is as follows:

Example 16

| Constituents: | Parts by weight |
|---|---|
| "Glyamine A" prepolymer as obtained in accordance with Example 1 | 30.0 |
| Nadic methyl anhydride | 17.4 |

Note.—Gels in about 30 minutes at 260° F. The product is hereinafter also called "Glyamine" resin.

As a very general rule the said Glyamine resin system post cures as follows:

Two hours at 200° F., then plus two hours further at 300° F., then plus 1 hour further at 400° F., or as another very general rule, 16 hours at 150° F., then plus 2 hours further at 300° F., then plus 1 hour further at 360° F.

Other examples of prepolymers cured in the presence of an acid anhydride are the following:

Example 17

Constituents: Parts by weight
"Glyamine A" prepolymer as obtained in accordance with Example 1 _____ 100
Nadic methyl anhydride _____ 30

Cure schedule: 5 hours at 200° F. plus 24 hours at 300° F.

Example 18

Constituents: Parts by weight
"Glyamine A" prepolymer as obtained in accordance with Example 7 _____ 100
Nadic methyl anhydride _____ 110

Cure schedule: 6 hours at 200° F., plus 6 hours at 320° F., plus 4 hours at 390° F.

Example 19

Constituents: Parts by weight
"Glyamine B" prepolymer as obtained in accordance with Example 10 _____ 100
Nadic methyl anhydride _____ 58
Tridimethylaminomethyl-phenol _____ 1

Cure schedule: 2 hours at 200° F., plus 4 hours at 390° F.

Other "Glyamine B" prepolymers based on hydroquinone derivatives are as follows:

Example 20

55.0 parts by weight of hydroquinone monomethyl ether are added slowly while stirring to 100.0 parts by weight of 1,4-butanediol diglycidyl ether that has been preheated to between 140–212° F. The mixture is thereafter maintained at between 140–212° F. while stirring until a homogeneous liquid is obtained. The temperature should not exceed above 220° F. The reaction product thus obtained is immediately cooled to room temperature or below to inhibit further reaction and is also called "Glyamine B" prepolymer.

The following example is a typical tabulation of approximate amounts of constituents used in obtaining "Glyamine B" prepolymer in accordance with the process as outlined in Example 20 above.

Example 21

Constituents: Parts by weight
1,4-butanediol diglycidyl ether _____ 100
Hydroquinone monomethyl ether _____ 15 to 62

Example 22

55.0 parts by weight of toluhydroquinone are added slowly while stirring to 100.0 parts by weight of 1,4-butanediol diglycidyl ether that has been preheated to between 212–260° F. The mixture is thereafter maintained at between 212–260° F. while stirring until a homogeneous liquid is obtained. The temperature shall not exceed 270° F. The reaction product thus obtained is immediately cooled to room temperature or below to inhibit further reaction and is also called "Glyamine B" prepolymer.

The following example is a typical tabulation of approximate amounts of constituents used in obtaining "Glyamine B" prepolymer in accordance with the process in Example 22 above.

Example 23

Constituents: Parts by weight
1,4-butanediol diglycidyl ether _____ 100
Toluhydroquinone _____ 15 to 62

Example 24

Example 1 is repeated employing the following diglycidyl ethers in equivalent amounts in place of 1,4-butanediol diglycidyl ether:

(A) 1,3-butanediol diglycidyl ether
(B) 2,3-butanediol diglycidyl ether
(C) 2-butenediol 1,4-diglycidyl ether
(D) 1,5-pentanediol diglycidyl ether
(E) Ethylene glycol diglycidyl ether
(F) Diethylene glycol diglycidyl ether
(G) Triethylene glycol diglycidyl ether
(H) Tripropylene glycol diglycidyl ether
(I) Hexanetriol diglycidyl ether
(J) Polyethylene glycol diglycidyl ether
(K) Glycerine diglycidyl ether Excellent and comparable results are obtained.

Example 25

Example 24A is repeated using the following, in equivalent amounts in place of the chloroaniline of that example:

(A) 4,4'-diaminodiphenyl sulfone
(B) Hydroquinone
(C) Toluhydroquinone
(D) Hydroquinone monomethyl ether
(E) Mono-tertiary-butylhydroquinone

Example 26

Examples 25A, 25B, 25C, 25D, and 25E are each repeated, separately, using in place of 1,3-butanediol diglycidyl ether, the following in equivalent amounts:

(1) 2,3-butanediol diglycidyl ether
(2) 2-butenediol 1,4-diglycidyl ether
(3) 1,5-pentanediol diglycidyl ether
(4) Ethylene glycol diglycidyl ether
(5) Diethylene glycol diglycidyl ether
(6) Triethylene glycol diglycidyl ether
(7) Tripropylene glycol diglycidyl ether
(8) Hexanetriol diglycidyl ether
(9) Polyethylene glycol diglycidyl ether
(10) Glycerine diglycidyl ether Excellent products, i.e., prepolymers, are obtained.

Example 27

Each of the prepolymers in Examples 24–26 are cured using the following curing agents:

(A) 12.0 g. triethylene tetramine/100 g. prepolymer
(B) 10.0 g. diethylene triamine/100 g. prepolymer
(C) 30.0 g. methylenediamine/100 g. prepolymer
(D) 15.0 g. m-phenylenediamine/100 g. prepolymer
(E) 18.0 g. 3,3',4,4'-tetraminobiphenyl/100 g. prepolymer
(F) 90 g. phthalic anhydride/100 g. prepolymer
(G) 75 g. maleic anhydride/100 g. prepolymer
(H) 80 g. succinic anhydride/100 g. prepolymer

Example 28

To each of the prepolymers of Examples 24–26 cured as in Example 27F–H, there are added the following accelerators:

(A) benzyldimethylamine (1 pt./100 pt. resin)
(B) dimethylaminomethyl-phenol (0.75 pt./100 pt. resin)

Outstanding products are obtained in all instances.

Various additives, mostly conventional ones in a general sense, may be added to the compositions of this invention. These include plasticizers, fillers, stabilizers, antifouling compounds, anti-oxidants, and the like.

Suitable plasticizers are:

Dibutyl phthalate
Dioctyl phthalate
Diethyl phthalate
Dibutyl sebacate
Dioctyl adipate
Dimethyl sebacate Ethylene glycol
Propylene glycol
Mineral oil
Triphenyl phosphate
Tricresyl phosphate
Tris(beta-chloroethyl)phosphate
Tri(dichloropropyl)phosphate
Castor oil Any suitable filler may be added to the mixture, according to the invention. A few examples of fillers to be mentioned are iron oxide, lead oxide, aluminum oxide, siliceous chalk, carbon black, silica sand, silica flour, ground mica, calcium carbonate, calcium silicate, granulated cork, graphite, limestone, marble chips, marble flour, silicone carbide, wood flour and vermiculite.

Other additives or fillers that may be employed in accordance with my invention are glass or resinous microspheres, resinous or glass microballoons, metallic microspheres, metallic microballoons, etc. The said above microballoons or microspheres may be either hollow or solid. The hollow microspheres or hollow microballoons not only act as fillers but also add buoyance to the composition when a body of the composition containing these hollow microspheres or hollow microballoons, or bodies, is immersed in a liquid. The amount of the filler to be used is governed by:

(a) The particle size of the filler, and
(b) The density of the filler, and
(c) The bulking valve of the filler.

In addition, the following organotin compounds may be added to the prepolymers for the preparation of antifouling coatings or anti-fouling paints:

*Organotin compounds*

Dimethyltin dichloride
Dibutyltin dichloride
Dibutyltin di-2-ethylhexoate
Dibutyltin naphthenate
Dibutyltin sulfide
Diphenyltin dichloride
Dioctyltin dichloride
Dilauryltin dichloride
Triethyltin acetate
Triisopropyltin chloride
Tripropyltin chloride
Tributyltin chloride
Tributyltin undecenylate
Tributyltin dodecylsuccinate
Tributyltin oxide
Tributyltin sulfide
Tributyltin polylinoleate
Hexabutyl ditin
Triamyltin acetate
Triphenyltin chloride
Triphenyltin acetate The preferred organotin compound is bis(tri-N-butyltin) oxide. However, of the organotin compounds now available, those containing triphenyltin or tributyltin radicals are likely to function as the most effective marine organism deterrents. The concentration of organotin as an anti-fouling ingredient when added to the prepolymers is about 100 parts by weight of the prepolymer to between 10 to 80 parts by weight of the organotin compound. The preferred concentration of organotin is between 50 to 80 parts by weight of tin to 100 parts by weight of the prepolymer.

Example 29

| Constituents: | Parts by weight |
|---|---|
| Prepolymer obtained by the reaction of 1,4-butanediol diglycidyl ether and monotertiarybutylhydroquinone | 100 |
| Bis(tri-N-butyltin) oxide | 70 |
| Pyrogenic silica (CAB-O-SIL) | 8 |
| Triethylenetetramine | 8 to 20 |

It is additionally noted that the conditions under which reaction may take place in order to obtain "Glyamine B" prepolymers are somewhat critical. However, a reasonably wide range of temperature may be used.

"Glyamine A" and "Glyamine B" prepolymers as obtained in accordance with the process of the invention are useful as starting materials for the production of plastics. Thus, Glyamine A prepolymers may be reacted by environmental conditions of time and temperature, with or without the subsequent addition of an amine curing agent at the time polymerization is desired to form "Glyamine" Resin or "Glyamine B" Resin which may take the form of coatings, castings, impregnations and encapsulations. The use of a curing agent is preferred with "Glyamine B" prepolymers. Plasticizers may be added to the prepolymers when desired. For use as coatings, the prepolymer should be thinner, by the addition of any of the usual or suitable paint and resin thinners such as xylene, toluene, amyl acetate, ketones, aliphatic hydrocarbons, trichloroethylene, tetrachlorothylene, and butyl cellosolve. Pigments may also be added to the prepolymer when color is desired. Pigments dispersed in epoxy resins are preferred. One may also add to the thinned prepolymer, any of the bodying or anti-sagging agents such as are commonly added to resin products.

As a very general rule various combinations of properties can be obtained by using different "Glyamine A" or "Glyamine B" prepolymers and curing agents such as amines. The service requirements of the fabricated article determine the particular type of formulation which should be used. No one formulation will give a cured "Glyamine" Resin or "Glyamine B" Resin having the necessary characteristics for all types of service, nor yield optimum values for all properties. Hence, the formulator must select the combination most suited to his particular needs. As another very general rule, the more cross-linking, the greater is the heat distortion temperature, hardness and resistance to chemicals of the cured products.

There are two important factors besides composition which greatly affect the properties of the cured products of this invention. One of these is the curing schedule and the other is the method of mixing. Curing may be carried out in one or more stages, depending upon the rate of reaction, mass, and exotherm of the mixture or mass. As a very general rule, better control can often be obtained at lower temperatures. Hence, a slower initial cure may be followed, if found necessary, or as may be desired by a post-cure at a higher temperature. This allows time for a more uniform generation of heat and its diffusion during the period of greatest heat distortion. Better color and fewer stresses are imparted in this way to the cured resin. Several different properties should be measured in determining the desired degree of cure. The particular ones selected by the formulator will depend upon the most critical for the specific end-use.

The following generalizations can be made with respect to the storage stability of the "Glyamine A" prepolymers:

The "Glyamine A" prepolymers as obtained in accordance with Examples 1, 6, 7, and 9, will begin to show gradual increase in viscosity with time, with a significant increase evident in about 20 days at about 70° F. The rate of increase in viscosity will be faster if the said prepolymers are stored at temperatures above 70° F.

An example of high temperature storage and effect on storage stability is as follows:

"Glyamine A" prepolymers as obtained in accordance with Examples 1 and 6 are converted into solid "Glyamine" Resins in under 72 hours at 160° F., without the subsequent addition of a curing agent.

The prepolymers, however, are usable up to the point where the viscosity of the said prepolymers is such that they may be pourable at 70° F.

It is to be further noted that as the "Glyamine A" prepolymers react slowly with time, a decrease in the concentration of curing agent may be advisable at the time cure is desired. It is postulated that a decrease in concentration of curing agent may be necessary, and this may be due to a greater degree of polymerization of the prepolymers with the passage of time and other environmental conditions, than as originally prepared.

It is to be noted, however, that the following compounds are useful as polymerization inhibitors for "Glyamine A" prepolymers, as obtained in accordance with Examples 1, 6, 7 and 9 of this invention. The use of these compounds increases the storage life considerably. Refrigeration of the prepolymers also increases the storage life considerably.

Typical inhibitors

Methyl ethyl ketone, acetone,
Acetophenone,
Xylene,
Ethyl acetate, etc.

The inhibitors are to be added to the prepolymers immediately after cooling the prepolymers to about room temperature or below at concentrations of 5–10 parts by weight of inhibitor to 100 parts by weight of prepolymer. The inhibitor must be thoroughly stirred into the prepolymer. The preferred inhibitor is acetone in about 10 parts by weight to 100 parts by weight prepolymer.

If the said prepolymers contain an inhibitor, it is recommended that the concentration of curing agent be increased between 10 to 50% by weight of the curing agent as shown in Examples 2, 3, 4, 5 and 8. It is to be noted however, that Glyamine B prepolymers have an indefinite shelf life at room temperature.

In the above examples, the prepolymers are described as derived from one diglycidyl ether and a co-reactant. It is, of course, clear that two or more different diglycidyl ethers may be reacted with one, two or more co-reactant amines or hydroquinones, and that, similarly mixtures of amine curing agents or mixtures of amine and anhydride curing agents may be used.

In addition to forming cured resins from the prepolymers herein disclosed by the employment of amine or anhydride curing agents, another recently developed curing agent which gives excellent results is 2-ethyl-4-methyl imidazole in amounts of from about 1 to 5 parts thereof per hundred of prepolymer (by weight). Still further, all of the prepolymers can be co-reacted to form novel and outstanding block copolymers, particularly with a cyclopentyl epoxide [e.g. bis (2,3-epoxycyclopentyl) ether] or 1,4-cyclohexadiene dioxide. Specific exemplifications are given below.

Example 30

100 pts. glyamine of Example 10 and 200 parts of the liquid isomer bis(2,3-epoxycyclopentyl) ether, having an epoxy equivalent of 90–95 are mixed at room temperature, and then there is added 85.2 parts of molten m-phenylenediamine (temperature 155° F.) which has been preheated to 155° F. until molten.

The mixture is cured as follows:

16 hours at 140° F., then 8 hours at 180° F., then 8 hours at 220° F., then 6 hours at 270° F., then 6–24 hours at 320° F.

Example 31

100 parts of molten (142 to 220° F.) cyclohexadiene dioxide are added to 100 parts of the prepolymer of Example 10. This mixture is cooled to room temperature and then 94 parts of m-phenylenediamine (temperature 150–160° F.) are added. Curing is effected using the following schedule:

6 hours at 135° F., then 6 hours at 210° F., and then 6–24 hours at 320° F.

In all of the above specific examples, illustrations are given of reaction conditions, reactants, concentrations of glycidyl ethers, concentrations of amine or phenolic co-reactant, and concentrations of curing agent or agents. It is, of course, clear that these are by way of example and illustration only and that all amounts herein disclosed and all ranges taught are operable to produce new, useful and outstanding prepolymers and resins as well as various compositions embodying same. Thus, it should be clearly noted that the broad range for the curing agents for the prepolymers is as follows:

(1) 4 to 35 parts of aliphatic amine curing agent for each 100 parts of prepolymer.
(2) 6 to 90 parts of aromatic amine curing agent for each 100 parts of prepolymer.
(3) 10 to 300 parts of polybasic acid anhydride curing agent for each 100 parts of prepolymer.

Where block copolymers are produced from the prepolymers of the present invention, the amount of amine curing agent to be used will vary somewhat from the above limits. Using cyclohexadiene dioxide as the block copolymer producing component, the amount of amine curing agent may vary from about 10 to about 90 per 100 parts of total resin. The latter is the total of the prepolymer and the cyclohexadiene dioxide. Each of the total resin components may range from about 1 to about 100 parts.

The production of block copolymers from the prepolymers of this invention, curing agent and an epoxy cyclopentyl ether requires the following general ranges of curing agents. With an amine as the curing agent, the range may be from about 6 to about 60 parts per 100 parts of total resin.

The prepolymer and resin compositions of the present invention should be carefully handled to prevent dermatitis conditions and for insuring trouble-free operations in view of the physiologically reactive components thereof as described above. The following recommendations are made to avoid or at least minimize such problems:

(1) Mechanical facilities.—Synthesis of, formulating, mixing, lay-up and curing operations should be conducted in a hood or enclosure with good exhaust ventilation. All handling equipment should be designed to minimize spills and drippings.

(2) Personal hygiene.—Rubber gloves should be worn at all times. Contaminated rubber gloves should be washed first with methyl ethyl ketone and then with soap and water, and allowed to dry before reusing. All skin areas contaminated by resin, prepolymer, curing agents, or uncured resin mixtures should be cleansed promptly. Showering at the end of the work day is advisable.

(3) Housekeeping.—Areas subject to contamination should be covered with disposable paper. Contamination should not be transferred to door knobs, valves, handrails, etc. from contaminated gloves. Housekeeping standards normally associated with food handling should be set as a goal to achieve when handling the resins, prepolymers, and all other reactive constituents.

The characterizing properties of the products embodying the invention and made in accordance with the processes of this invention may vary somewhat with use of different batches of commercially available chemical components, chemical reactants, curing agents, plasticizers and fillers, etc. so that the various prepolymers of this invention as prepared by employing the same reactants and/or subsequently cured with the same curing agents under identical or corresponding conditions may or may not produce a product always with identical properties. Changes in the production techniques for the chemical compounds and/or components used or involved with respect to this invention may over a period of time, have a considerable or cumulative effect on the products embodying the invention and made in accordance with the processes of this invention, hence periodic re-evaluation may be advisable. It should be noted that one specific property may be optimum with one curing agent, prepolymer, resin or plasticizer, a second specific property may be optimum with another specific curing agent, prepolymer, resin or plasticizer, or with different proportions used, and so on. With different batches of mixes some characterizing properties may vary substantially due to variations in the commercial materials employed and in the operating conditions existing while the product or products are being made. Because of the variations in batch properties and materials, cure cycles, design and end use objectives, all values, examples, proportions, conditions, properties and statements given hereinabove are to be considered as typical, illustrative and representative and are not to be considered as optimum, and are not necessarily optimum.

By the use of the term "room temperature," it is intended to include temperatures in the range of about 30° F. to about 100° F. in an atmosphere of unspecified relative humidity, including the range of 68° F. to 86° F. recited as the room temperature range by the ASTM Standards on Plastics, 12th edition, March 1961.

It will be further understood that various changes in the details, materials and arrangement of parts and steps, which have been herein described and illustrated in order to explain the nature of the invention, may be made by those skilled in the art within the principle and scope of the invention as expressed in the appended claims.

I claim:
1. The method of making a resinous prepolymer which comprises mixing together:
   (a) a diglycidyl ether obtained from epichlorohydrin and a polyhydric alcohol having a hydrocarbon chain between the hydroxyl groups, and
   (b) a material selected from the group consisting of aromatic chlorine-hindered diamines, aromatic sulphur-containing diamines, hydroquinone, toluhydroquinone, hydroquinone monomethyl ether, and mono-tertiary-butyl hydroquinone,
   (c) stirring the mixture at an elevated temperature until a homogeneous liquid is obtained; and then
   (d) cooling such liquid to about room temperature or below.

2. The method according to claim 1, wherein the said diglycidyl ether of a polyhydric alcohol is 1,4-butanediol digylcidyl ether.

3. The method according to claim 1, wherein said diamine is 4,4'-methylene-bis(2 chloroaniline).

4. The method according to claim 1, wherein said diamine is 4,4'-diaminodiphenyl sulfone.

5. The method according to claim 1, wherein said material is hydroquinone.

6. The method according to claim 1, wherein said material is mono-tertiary-butylhydroquinone.

7. The method according to claim 1, wherein said material is hydroquinone monomethyl ether.

8. The method according to claim 1, wherein said material is toluhydroquinone.

9. The method according to claim 1, wherein said elevated temperature is between 212° F. and 225° F.

10. The method of making a prepolymer which comprises:
   (I) mixing slowly together
      (a) 1,4-butanediol diglycidyl ether and
      (b) 4,4'-diaminodiphenyl sulfone,
   (II) maintaining the mixture at a temperature approximately between 240° F. to 250° F. while stirring until a homogeneous liquid is obtained, and
   (III) then immediately cooling such homogeneous liquid to about room temperature or below.

11. The method of making a prepolymer which comprises mixing slowly together
   (a) 1,4-butanediol diglycidyl ether and
   (b) hydroquinone, and
   (c) maintaining the mixture at a temperature approximately between 212° F. to 260° F. while stirring until a homogeneous liquid is obtained, and
   (d) then immediately cooling such homogeneous liquid to about room temperature or below.

12. The method of making prepolymer which comprises mixing slowly together
   (a) 1,4-butanediol diglycidyl ether,
   (b) mono-tertiary-butylhydroquinone, and
   (c) maintaining the mixture at a temperature approximately between 250° F. to 260° F. while stirring until a homogeneous liquid is obtained, and
   (d) then immediately cooling such homogeneous liquid to about room temperature or below.

13. The method of making a prepolymer which comprises mixing slowly together
   (a) 1,4-butanediol diglycidyl ether and
   (b) hydroquinone monomethyl ether, and
   (c) maintaining the mixture at a temperature approximately between 140° F. to 230° F. while stirring until a homogeneous liquid is obtained, and
   (d) then immediately cooling such homogeneous liquid to about room temperature or below.

14. The method of making a prepolymer which comprises mixing slowly together
   (a) 1,4-butanediol diglycidyl ether and
   (b) toluhydroquinone, and
   (c) maintaining the mixture at a temperature approximately between 212° F. to 260° F. while stirring until a homogeneous liquid is obtained, and
   (d) then immediately cooling such homogeneous liquid to about room temperature or below.

15. A method according to claim 1, wherein for each 100 parts of said diglycidyl ether there are used from about 15 to about 85 parts by weight of said material selected from the group.

16. The method for curing a resinous prepolymer as prepared by the method defined in claim 1, wherein for each 100 parts of the said prepolymer, there are used a curing agent selected from the class consisting of about 4 to 35 parts of an aliphatic amine, from about 6 to about 90 parts of an aromatic amine, all on a weight basis.

17. The method of making a resinous prepolymer and curing the same which comprises mixing together:
   a diglycidyl ether obtained from epichlorohydrin and a polyhydric alcohol having a hydrocarbon chain between the hydroxyl groups, and
   a material selected from the group consisting of aromatic chlorine-hindered diamines, aromatic sulphur-containing diamines, hydroquinone, and toluhydroquinone, hydroquinone monomethyl ether, and mono-tertiary-butyl hydroquinone, and
   stirring the mixture at an elevated temperature until a homogeneous liquid is obtained; and then
   cooling such homogeneous prepolymer liquid to about room temperature,
   adding to said homogeneous liquid for each 100 parts thereof from about 10 to 300 parts of a polybasic acid anhydride, and from about 0.5 to 2 parts of a tertiary amine having one phenyl group bonded to an amino nitrogen, all on a weight basis.

References Cited

UNITED STATES PATENTS

| 2,633,458 | 3/1953 | Shokal. |
| 3,018,258 | 1/1962 | Meier et al. |
| 3,033,803 | 5/1962 | Price et al. |
| 3,236,793 | 2/1966 | Robins et al. _____ 260—429.7 |
| 2,965,610 | 12/1960 | Newey. |

WILLIAM H. SHORT, *Primary Examiner.*

T. PERTILLA, *Assistant Examiner.*